US010111095B2

(12) United States Patent
Patel et al.

(10) Patent No.: US 10,111,095 B2
(45) Date of Patent: Oct. 23, 2018

(54) CACHING A PAIRWISE MASTER KEY FOR DROPPED WIRELESS LOCAL AREA NETWORK (WLAN) CONNECTIONS TO PREVENT RE-AUTHENTICATION

(71) Applicant: Verizon Patent and Licensing Inc., Arlington, VA (US)

(72) Inventors: Pritesh Patel, Franklin Park, NJ (US); Youjian Xu, Cedar Knolls, NJ (US); David H. Ten Eyck, Flemington, NJ (US); Aldrich Gamboa, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 164 days.

(21) Appl. No.: 15/068,965

(22) Filed: Mar. 14, 2016

(65) Prior Publication Data

US 2017/0265070 A1 Sep. 14, 2017

(51) Int. Cl.
*H04W 12/06* (2009.01)
*H04W 12/04* (2009.01)
*H04W 84/12* (2009.01)

(52) U.S. Cl.
CPC .......... *H04W 12/06* (2013.01); *H04W 12/04* (2013.01); *H04W 84/12* (2013.01); *H05K 999/99* (2013.01)

(58) Field of Classification Search
CPC .................................................. H04W 12/84
USPC ........................................................... 726/4
See application file for complete search history.

(56) References Cited

U.S. PATENT DOCUMENTS

| 7,630,712 | B2 * | 12/2009 | Altshuller | ........... | H04L 63/0815 |
| | | | | | 455/432.1 |
| 7,814,322 | B2 * | 10/2010 | Gurevich | ................ | H04L 45/20 |
| | | | | | 370/252 |
| 8,031,872 | B2 * | 10/2011 | Bakshi | .................. | H04L 63/068 |
| | | | | | 380/247 |

(Continued)

OTHER PUBLICATIONS

Clancy et al., "Handover Key Management and Re-Authentication Problem Statement," https://tools.ietf.org/pdf/rfc5169.pdf, Mar. 2008, 15 pages.

(Continued)

*Primary Examiner* — Taghi Arani
*Assistant Examiner* — Badri Champakesan

(57) ABSTRACT

A device may determine that a first wireless local area network (WLAN) connection, established with a first WLAN access point using an extensible authentication protocol, has been dropped. The device may store a pairwise master key identifier, associated with the first WLAN access point, based on determining that the first WLAN connection has been dropped. The device may detect a WLAN signal, associated with the first WLAN access point or a second WLAN access point, after determining that the first WLAN connection has been dropped. The device may provide the pairwise master key identifier to the first WLAN access point or the second WLAN access point based on detecting the WLAN signal. The device may establish a second WLAN connection with the first WLAN access point or the second WLAN access point based on providing the pairwise master key identifier and without re-authenticating using the extensible authentication protocol.

20 Claims, 8 Drawing Sheets

(56) References Cited

U.S. PATENT DOCUMENTS

| | | | | |
|---|---|---|---|---|
| 8,099,597 B2* | 1/2012 | Nakhjiri | ............. | H04W 12/06 380/270 |
| 8,363,617 B2* | 1/2013 | Meyer | ............. | H04W 48/20 370/331 |
| 8,539,559 B2* | 9/2013 | Nakhjiri | ............. | H04L 63/06 726/4 |
| 8,555,069 B2* | 10/2013 | Zhu | ............. | H04L 9/3271 713/175 |
| 2006/0075216 A1* | 4/2006 | Vaha-Sipila | ............. | G06F 21/575 713/2 |
| 2008/0063204 A1* | 3/2008 | Braskich | ............. | H04L 9/0836 380/270 |
| 2008/0072047 A1* | 3/2008 | Sarikaya | ............. | H04L 9/32 713/171 |
| 2008/0212783 A1* | 9/2008 | Oba | ............. | H04L 9/083 380/279 |
| 2009/0031138 A1* | 1/2009 | Nakhjiri | ............. | H04L 63/08 713/181 |
| 2009/0209196 A1* | 8/2009 | Haverty | ............. | H04K 3/28 455/1 |
| 2013/0212439 A1* | 8/2013 | Stevens | ............. | H04L 43/12 714/39 |
| 2014/0040633 A1* | 2/2014 | Leleu | ............. | G06F 21/36 713/189 |
| 2015/0254677 A1* | 9/2015 | Huxham | ............. | G06K 19/0709 705/57 |
| 2015/0334571 A1* | 11/2015 | Xu | ............. | H04W 12/04 455/410 |
| 2016/0183084 A1* | 6/2016 | Balasubramanian | ............. | H04W 12/04 726/4 |

OTHER PUBLICATIONS

Aboba et al., "Extensible Authentication Protocol (EAP)," https://tools.ietf.org/pdf/rfc3748.pdf, Jun. 2004, 67 pages.

Wikipedia, "IEEE 802.11i-2004," https://en.wikipedia.org/wiki/IEEE_802.11i-2004, Feb. 21, 2016, 4 pages.

Wikipedia, "IEEE 802.11r-2008," https://en.wikipedia.org/wiki/IEEE_802.11r-2008, Nov. 11, 2015, 3 pages.

Wikipedia, "IEEE 802.1X," https://en.wikipedia.org/wiki/IEEE_802.1X, Mar. 13, 2016, 8 pages.

Burns, "How 802.1x authentication works," http://www.computerworld.com/article/2581074/mobile-wireless/how-802-1x-authentication-works.html, Apr. 3, 2003, 5 pages.

Jimenez, "802.11 WLAN Roaming and Fast-Secure Roaming on CUWN," http://www.cisco.com/c/en/us/support/docs/wireless-mobility/wireless-lan-wlan/116493-technote-technology-00.html, Mar. 10, 2015, 44 pages.

* cited by examiner

CACHING A PAIRWISE MASTER KEY FOR DROPPED WIRELESS LOCAL AREA NETWORK (WLAN) CONNECTIONS TO PREVENT RE-AUTHENTICATION

BACKGROUND

Extensible Authentication Protocol (LAP) is an authentication framework used in wireless networks and point-to-point connections. EAP permits the transport and usage of keying material and parameters generated by a variety of EAP methods. EAP defines message formats, and each protocol that uses EAP defines a way to encapsulate EAP messages within that protocol's messages.

DETAILED DESCRIPTION OF PREFERRED EMBODIMENTS

The following detailed description of example implementations refers to the accompanying drawings. The same reference numbers in different drawings may identify the same or similar elements.

A client device may use a protocol for fast transitions between wireless local area network (WLAN) access points, such as the Institute of Electrical and Electronics Engineers (IEEE) 802.11r protocol. Further, the client device may use an authentication protocol for secure communications with the WLAN access point, such as an Extensible Authentication Protocol (EAP). When a connection between the client device and the WLAN access point is dropped, the client device may be required to re-authenticate using EAP authentication. Implementations described herein permit a client device to prevent re-authentication when a WLAN connection is dropped and re-established, thereby conserving computing resources of an authentication device responsible for EAP authentication (and other devices involved with EAP authentication), conserving network resources by preventing unnecessary EAP messages from being transmitted, or the like.

Figure 1A:
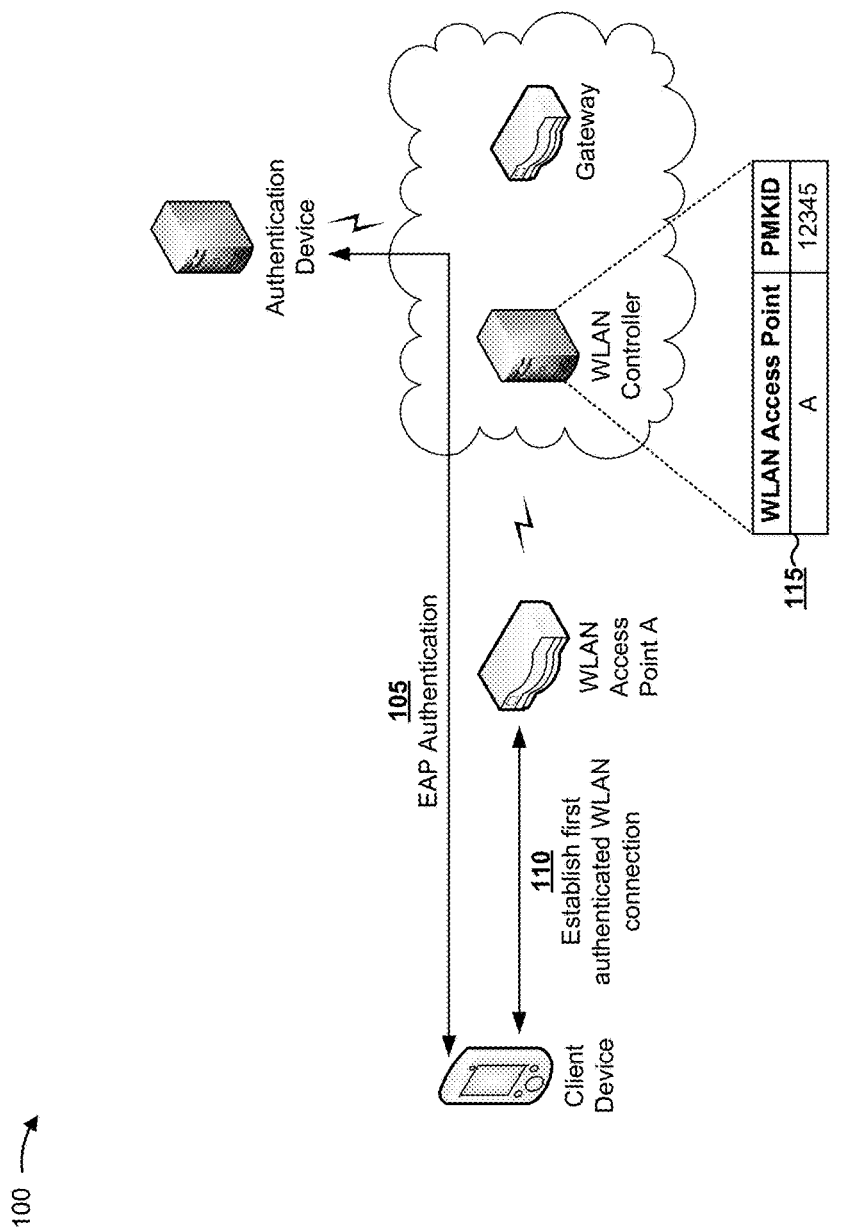
FIGS. 1A-1D are diagrams of an overview of an example implementation described herein.

FIGS. 1A-1D are diagrams of an overview of an example implementation 100 described herein. As shown in FIG. 1A, and by reference number 105, assume that a client device communicates with an authentication device to perform EAP authentication. The client device may communicate with the authentication device via a WLAN access point (shown as WLAN Access Point A), a WLAN controller, and/or a gateway. The authentication device may authenticate the client device (e.g., based on a credential), which may permit the client device to establish a first authenticated WLAN connection with WLAN Access Point A, as shown by reference number 110. As shown by reference number 115, the WLAN controller may store a pairwise master key identifier (PMKID) based on a pairwise master key generated by the authentication device (e.g., a PMKID shown as "12345"). The pairwise master key may be associated with WLAN Access Point A, and may permit secure communication between WLAN Access Point A and the client device.

Figure 1B:
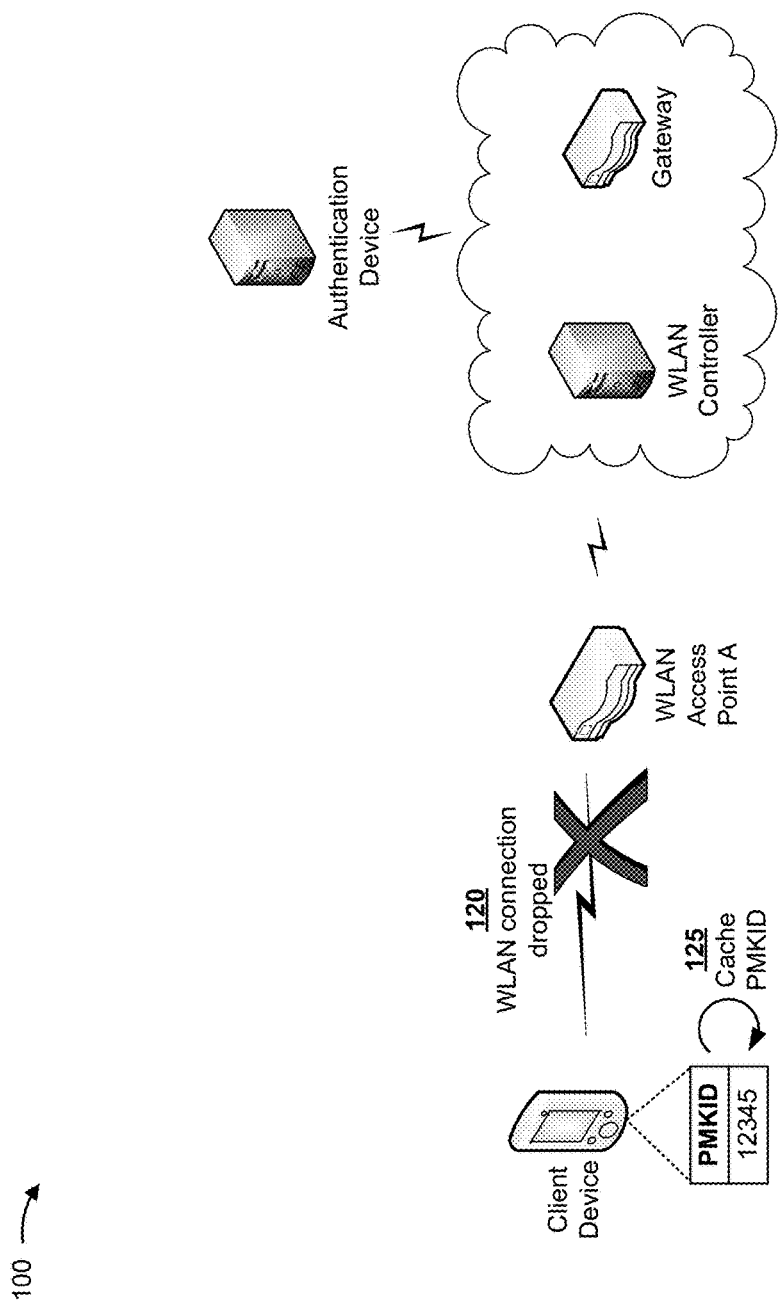

As shown in FIG. 1B, and by reference number 120, assume that the first authenticated WLAN connection is dropped. For example, the client device may leave a coverage area served by WLAN Access Point A. The client device may determine that the first authenticated WLAN connection has been dropped, and may store (e.g., cache) the PMKID (e.g., "12345") based on this determination, as shown by reference number 125.

Figure 1C:
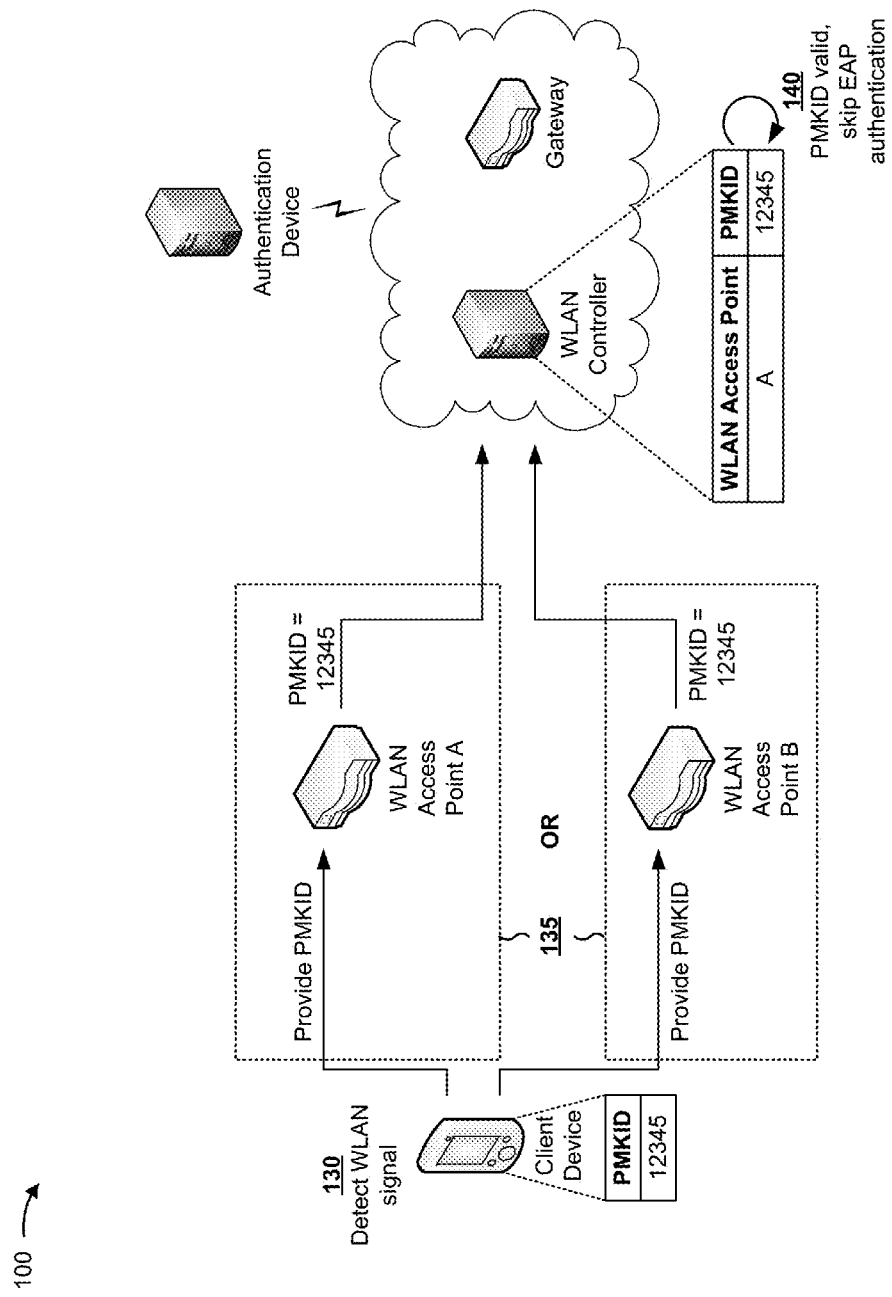

As shown in FIG. 1C, assume that after the WLAN connection has been dropped, the client device detects a WLAN signal, as shown by reference number 130. As shown by reference number 135, the WLAN signal may be a signal from the same WLAN access point to which the client device was previously connected (e.g., WLAN Access Point A) or a different WLAN access point (e.g., WLAN Access Point B). In either case, the client device may provide the stored PMKID to the WLAN access point from which the WLAN signal is detected. The WLAN access point may then provide the PMKID, received from the client device, to the WLAN controller. As shown by reference number 140, the WLAN controller may search a data structure to determine that the PMKID is valid (e.g., was used for a previously-authenticated WLAN connection with WLAN Access Point A), and may prevent (e.g., skip) EAP authentication for the client device based on this determination.

Figure 1D:
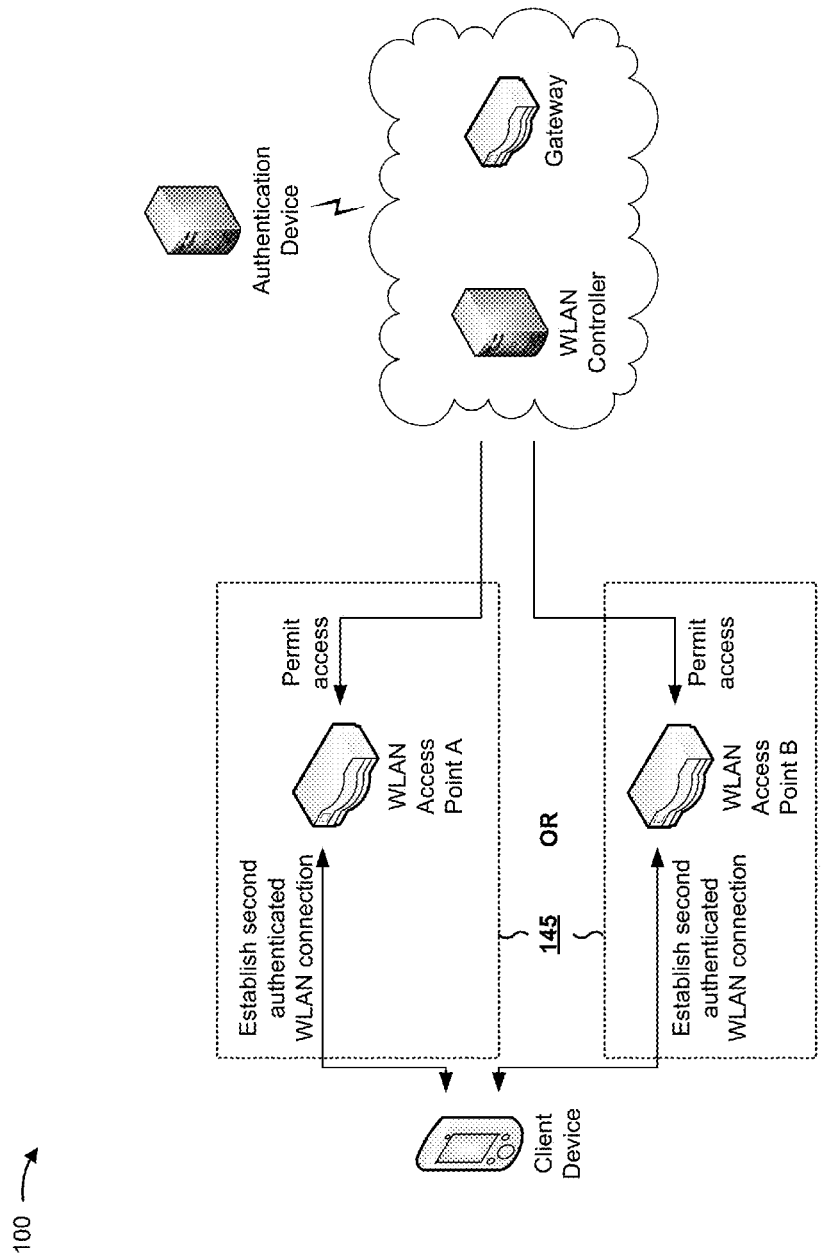

As shown in FIG. 1D, and by reference number 145, the WLAN controller may instruct the WLAN access point (e.g., WLAN Access Point A or WLAN Access Point B) to permit network access for the client device. For example, the WLAN controller may provide an indication that the client device has been authenticated. Based on this information, the WLAN access point may established a second authenticated WLAN connection with the client device. In this way, the client device may be authenticated for secure WLAN communications without requiring the client device to re-authenticate using EAP authentication after a WLAN connection is dropped and re-established. This may conserve computing resources and prevent overloading of the authentication device by preventing unnecessary re-authentication of previously-authenticated client devices. Furthermore, this may conserve computing resources of the client device by preventing unnecessary re-authentication of the client device. Furthermore, this may conserve network resources by preventing unnecessary transmission of EAP authentication messages.

As indicated above, FIGS. 1A-1D are provided merely as an example. Other examples are possible and may differ from what was described with regard to FIGS. 1A-1D.

Figure 2:
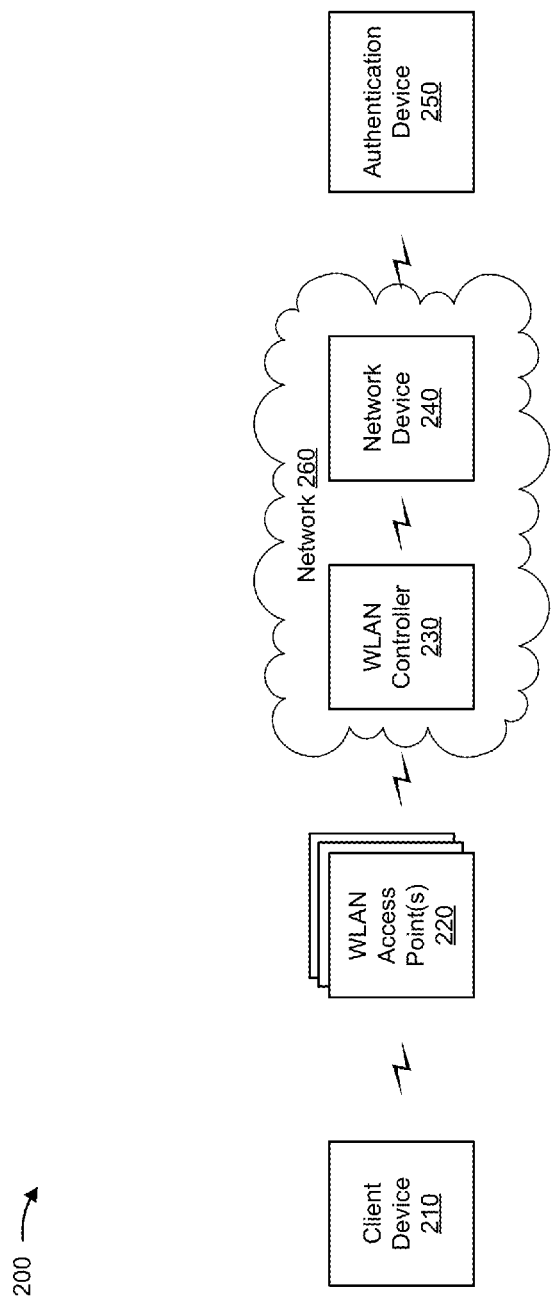
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, one or more WLAN access points 220, a WLAN controller 230, a network device 240, an authentication device 250, and a network 260. Devices of environment 200 may interconnect via wired connections, wireless connections, or a combination of wired and wireless connections.

Client device 210 includes one or more devices capable of connecting to a WLAN (e.g., Wi-Fi) network. For example, client device 210 may include a communication device and/or a WLAN client device, such as a mobile phone (e.g., a smart phone and/or a radiotelephone), a tablet computer, a laptop computer, a gaming device, a wearable communication device (e.g., a smart wristwatch and/or a pair of smart eyeglasses), or a similar type of device.

WLAN access point 220 includes one or more devices capable of communicating wirelessly with local devices (e.g., via a WLAN connection), such as client device 210, and providing connectivity, for the local devices, to devices connected to another network, such as network 260. For example, WLAN access point 220 may include a router, a modem, a switch, a hub, a bridge, a gateway, an access point, a base station, or a similar type of device. WLAN access point 220 may communicate wirelessly using one or more short-range wireless communication protocols, such as IEEE 802.11 (e.g., Wi-Fi), or the like.

WLAN controller 230 includes one or more devices capable of managing one or more WLAN access points 220. For example, WLAN controller 230 may be used by a network administrator to manage multiple (e.g. lightweight) WLAN access points 220. In some implementations, WLAN controller 230 may manage, for example, configuration, load balancing, interference detection, and/or interference avoidance for one or more WLAN access points 220.

Network device 240 includes one or more devices (e.g., one or more traffic transfer devices) capable of processing and/or transferring traffic between other devices of environment 200. For example, network device 240 may include a gateway, a reverse proxy, a router, a firewall, a switch, a hub, a bridge, a server (e.g., a proxy server), a security device, an intrusion detection device, a load balancer, or a similar type of device.

Authentication device 250 includes one or more devices capable of authenticating client device 210 using an extensible authentication protocol (EAP), such as 802.1X EAP. For example, authentication device 250 may include an authentication, authorization, and accounting (AAA) server, a remote authentication dial-in user service (RADIUS) server, a home subscriber server (HSS), or a similar type of device.

Network 260 includes one or more wired and/or wireless networks. For example, network 260 may include a cellular network (e.g., a long-term evolution (LTE) network, a third generation (3G) network, a fourth generation (4G) network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
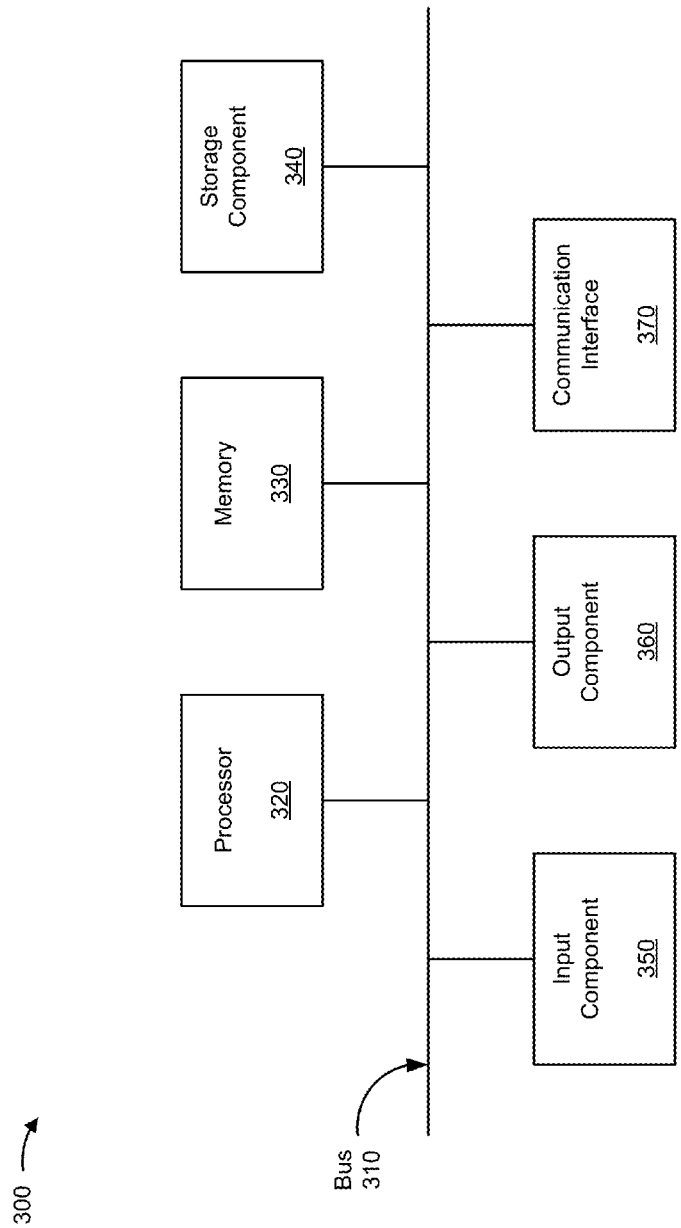
FIG. 3 is a diagram of example components of one or more devices of FIG. 2.

FIG. 3 is a diagram of example components of a device 300. Device 300 may correspond to client device 210, WLAN access point 220, WLAN controller 230, network device 240, and/or authentication device 250. In some implementations, client device 210, WLAN access point 220, WLAN controller 230, network device 240, and/or authentication device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
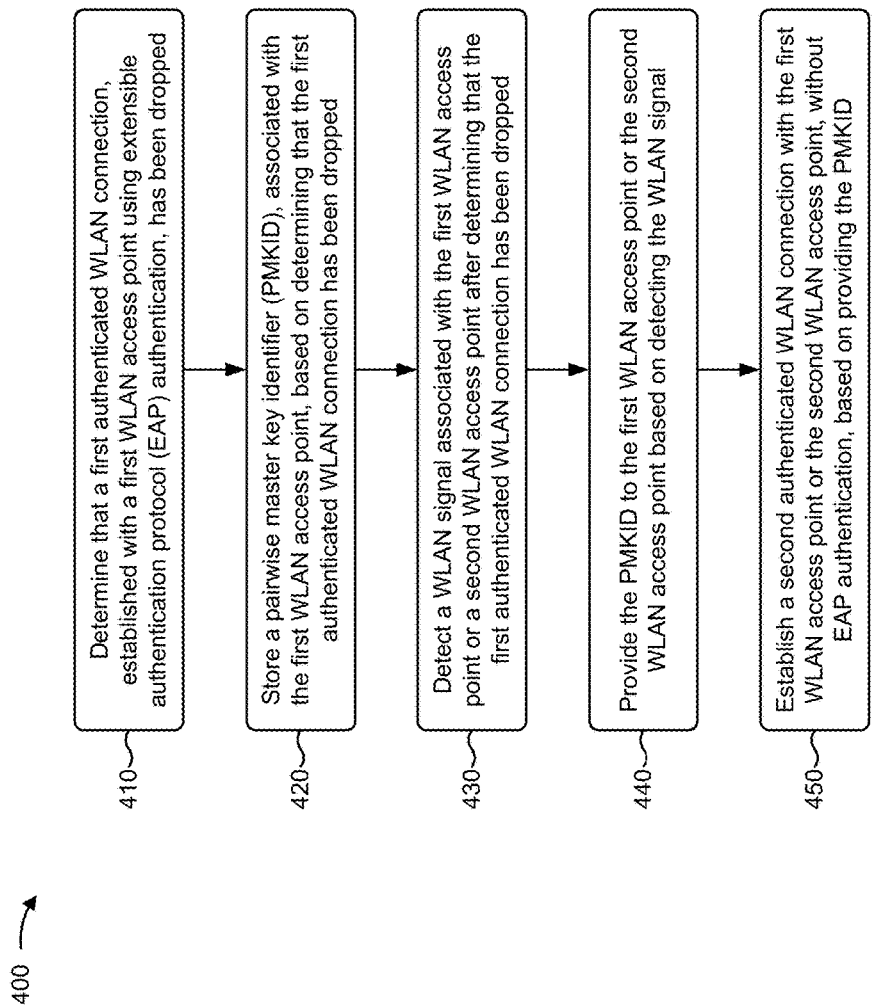
FIG. 4 is a flow chart of an example process for caching a pairwise master key for dropped WLAN connections to prevent re-authentication.

FIG. 4 is a flow chart of an example process 400 for caching a pairwise master key for dropped WLAN connections to prevent re-authentication. In some implementations, one or more process blocks of FIG. 4 may be performed by client device 210. In some implementations, one or more process blocks of FIG. 4 may be performed by another device or a group of devices separate from or including client device 210, such as WLAN access point 220, WLAN controller 230, network device 240, and/or authentication device 250.

As shown in FIG. 4, process 400 may include determining that a first authenticated WLAN connection, established with a first WLAN access point using extensible authentication protocol (EAP) authentication, has been dropped (block 410). For example, client device 210 and WLAN access point 220 may establish a first authenticated WLAN connection. This connection may be established using EAP authentication (e.g., IEEE 802.1X EAP authentication). For example, client device 210 may provide a credential to authentication device 250 (e.g., via WLAN access point 220, WLAN controller 230, and/or network device 240). Authentication device 250 may authenticate client device 210 using the credential, and may generate a pairwise master key (e.g., using another key shared by authentication device 250 and/or client device 210, such as an authentication, authorization, and accounting (AAA) key).

Authentication device 250 may provide a copy of the pairwise master key for storage by WLAN controller 230 and/or WLAN access point 220. Additionally, or alternatively, authentication device 250 may provide, to client device 210, an indication of successful EAP authentication. Client device 210 may generate and/or receive a pairwise master key based on successful EAP authentication. Client device 210 and WLAN access point 220 may use respective copies of the pairwise master key to establish the first authenticated WLAN connection (e.g., by performing a four-way handshake, such as defined by IEEE 802.11i). In some implementations, when establishing the first authenticated WLAN connection, client device 210 and WLAN access point 220 may utilize 802.11r protocols for fast transition.

After establishing the first authenticated WLAN connection, client device 210 may determine that this connection has been dropped. For example, client device 210 may leave a coverage area served by WLAN access point 220, may detect that a WLAN signal has been lost, may determine that client device 210 is not detecting a WLAN signal, may determine that client device 210 is not detecting a WLAN signal that satisfies a threshold, or the like. In some implementations, determining that a WLAN connection has been dropped may refer to determining that client device 210 does not have a WLAN signal, and not that client device 210 is undergoing a handover from a first WLAN access point 220 to a second WLAN access point 220. In the case where client device 210 is undergoing a handover (e.g., fast transition), client device 210 may utilize the IEEE 802.11r protocol, and may not store a pairwise master key to prevent re-authentication, in some implementations.

As further shown in FIG. 4, process 400 may include storing a pairwise master key identifier (PMKID), associated with the first WLAN access point, based on determining that the first authenticated WLAN connection has been dropped (block 420). For example, client device 210 may store a pairwise master key identifier based on determining that the first authenticated WLAN connection has been dropped. The pairwise master key identifier may include the pairwise master key and/or an identifier that identifies the pairwise master key. The pairwise master key identifier may be associated with WLAN access point 220 for which the first authenticated WLAN connection has been dropped.

In some implementations, client device 210 may store the pairwise master key identifier only when a WLAN connection is dropped (e.g., as opposed to storing a pairwise master key identifier based on a handover or another scenario). This may increase security and conserve computing resources of client device 210 by limiting the scenarios in which the pairwise master key identifier is stored. Additionally, or alternatively, client device 210 may be configured to store only one pairwise master key identifier, rather than a list of multiple pairwise master key identifiers. This may also increase security and conserve computing resources of client device 210 by limiting the quantity of pairwise master key identifiers permitted to be stored by client device 210.

In some implementations, client device 210 may store the pairwise master key identifier for a threshold amount of time, and may delete the pairwise master key from memory after the threshold amount of time has expired. In some implementations, the threshold amount of time may be based on a timer associated with a Dynamic Host Configuration Protocol (DHCP), such as a DHCP lease timer that indicates an amount of time that an Internet Protocol (IP) address is reserved for client device 210 after being assigned to client device 210. For example, the threshold amount of time may be greater than or equal to a duration of the DHCP lease timer (e.g., if the DHCP lease timer is set for 60 minutes, then the threshold amount of time may be set to 60 minutes, 61 minutes, 65 minutes, or the like).

In this way, client device 210 may re-use a pairwise master key while an IP address remains assigned to client device 210 (e.g., an IP address associated with client device 210 for the first authenticated WLAN connection), and may discard the pairwise master key identifier when the IP address expires (e.g., is no longer reserved for client device 210). Furthermore, this may increase security and conserve memory resources of client device 210 by limiting the amount of time that a pairwise master key identifier is permitted to be stored by client device 210.

As further shown in FIG. 4, process 400 may include detecting a WLAN signal associated with the first WLAN access point or a second WLAN access point after determining that the first authenticated WLAN connection has been dropped (block 430). For example, after the first authenticated WLAN connection is dropped, client device 210 may detect a WLAN signal. In some implementations, the WLAN signal may be a signal from the same WLAN access point 220 with which client device 210 was connected for the first authenticated WLAN connection. In some implementations, the WLAN signal may be a signal from a different WLAN access point 220 than a WLAN access point 220 to which client device 210 was connected for the first authenticated WLAN connection. For example, after leaving a first coverage area associated with a first WLAN access point 220 and determining that the first authenticated WLAN connection has been dropped, client device 210 may re-enter the first coverage area or may enter a second coverage area associated with a second WLAN access point 220.

In some implementations, client device 210 may detect the WLAN signal by transmitting a probe request and receiving a probe response. The probe request may include capability information associated with client device 210, such as supported data rates, supported 802.11 protocols (e.g., 802.11i, 802.11r, 802.11n, etc.). WLAN access point 220 may receive the probe request, and may transmit a probe response if a set of capabilities supported by WLAN access point 220 are compatible with (e.g., match) a set of capabilities supported by client device 210. Client device 210 may receive the probe response.

In some implementations, the first WLAN access point 220 and the second WLAN access point 220 may be associated with a same mobility domain. For example, the first WLAN access point 220 and the second WLAN access point 220 may be controlled by the same WLAN controller 230, may perform authentication using the same authentication device 250, or the like.

As further shown in FIG. 4, process 400 may include providing the PMKID to the first WLAN access point or the second WLAN access point based on detecting the WLAN signal (block 440), and establishing a second authenticated WLAN connection with the first WLAN access point or the second WLAN access point, without EAP authentication, based on providing the PMKID (block 450). For example, client device 210 may provide the pairwise master key identifier to the first WLAN access point 220 (e.g., when client device 210 detects a WLAN signal from the first WLAN access point 220) or the second WLAN access point 220 (e.g., when client device 210 detects a WLAN signal from the second WLAN access point 220). In some implementations, client device 210 may provide the pairwise master key identifier in an Association Response message (e.g., in response to an Association Request message received from WLAN access point 220).

In some implementations (e.g., when WLAN controller 230 stores pairwise master key identifiers), WLAN access point 220 may provide the pairwise master key identifier, received from client device 210, to WLAN controller 230. In this case, WLAN controller 230 may search a data structure for the pairwise master key identifier. If found, WLAN controller 230 may provide an indication, to WLAN access point 220, that client device 210 is authenticated (e.g., has previously been authenticated). Based on receiving this indication, WLAN access point 220 and client device 210 may proceed to establish a second authenticated WLAN connection (e.g., by performing a four-way handshake, such as that defined in IEEE 802.11i). If not found, WLAN controller 230 may require EAP authentication between client device 210 and authentication device 250.

In some implementations (e.g., when WLAN access point 220 stores pairwise master key identifiers), WLAN access point 220 may search a data structure for the pairwise master key identifier received from client device 210. If found, WLAN access point 220 and client device 210 may proceed to establish a second authenticated WLAN connection, in a similar manner as described above. If not found, WLAN access point 220 may require EAP authentication between client device 210 and authentication device 250.

In this way, WLAN access point 220 and/or WLAN controller 230 may prevent re-authentication of client device 210 when a WLAN connection is dropped and re-established, thereby conserving computing resources of client device 210 and authentication device 250, conserving network resources by preventing unnecessary EAP messages from being transmitted, or the like.

In some implementations, client device 210 may delete the pairwise master key from memory after the second authenticated WLAN connection is established. This may increase security and conserve memory resources of client device 210 by limiting the amount of time that a pairwise master key identifier is stored by client device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
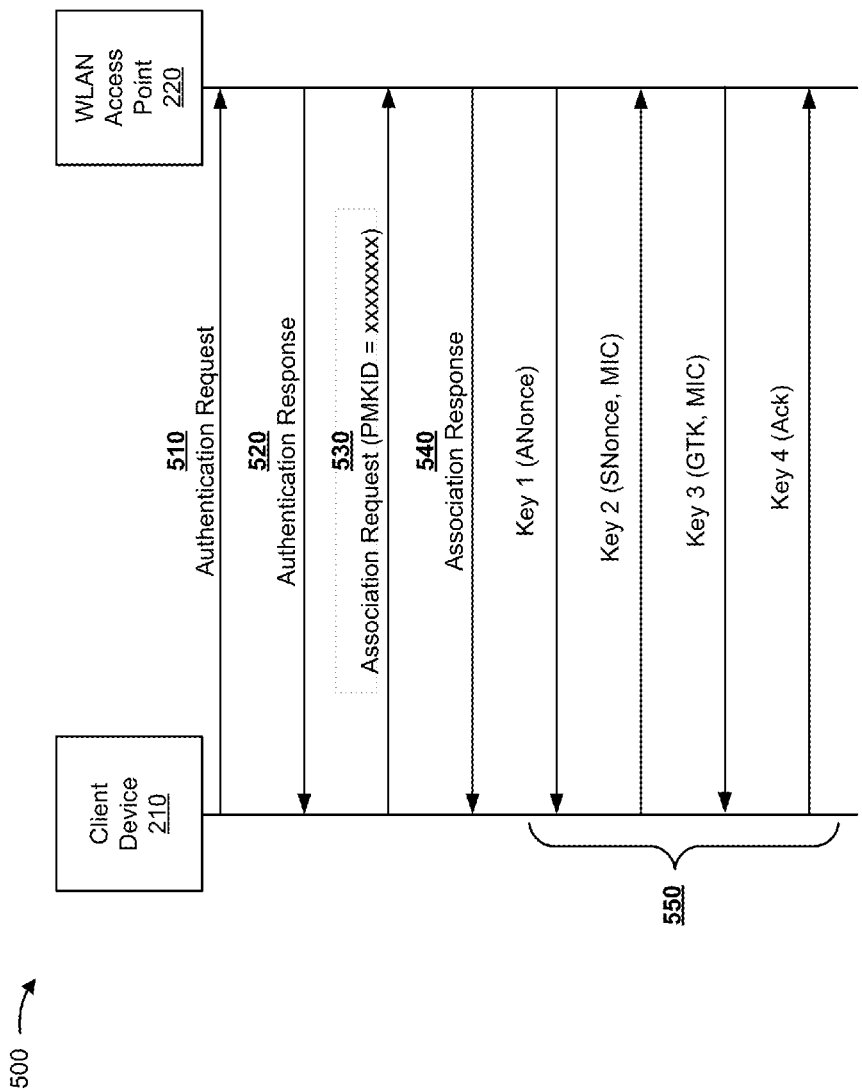
FIG. 5 is a diagram of an example call flow of example operations capable of being performed by one or more devices of FIG. 2.

FIG. 5 is a diagram of an example call flow 500 of example operations capable of being performed by one or more devices of FIG. 2. FIG. 5 shows example operations associated with caching a pairwise master key for dropped WLAN connections to prevent re-authentication.

For the purpose of FIG. 5, assume that WLAN access point 220 has previously authenticated client device 210 using EAP authentication, and has previously established an authenticated WLAN connection based on successful EAP authentication of client device 210. Further, assume that this authenticated WLAN connection has been dropped, and that client device 210 has stored a pairwise master key identifier based on detecting that the authenticated WLAN connection has been dropped. Finally, assume that client device 210 has detected a WLAN signal from WLAN access point 220 after the previously-established WLAN connection has been dropped.

As shown in FIG. 5, and by reference number 510, client device 210 may transmit, to WLAN access point 220, an Authentication Request message after detecting the WLAN signal from WLAN access point 220. The Authentication Request message may be a message associated with 802.11 authentication (e.g., Open System authentication), and not EAP authentication. As shown by reference number 520, WLAN access point 220 may transmit, to client device 210, an Authentication Response message based on receiving the Authentication Request message. Similar to the Authentication Request message, the Authentication Response message may be a message associated with 802.11 authentication (e.g., Open System authentication), and not EAP authentication.

As shown by reference number 530, based on receiving the Authentication Response message, client device 210 may transmit, to WLAN access point 220, an Association Request message. In some implementations, the pairwise master key identifier (shown as PMKID) may be included in the Association Request message (e.g., in a header, a trailer, a body, etc.). As shown by reference number 540, WLAN access point 220 may transmit, to client device 210, an Association Response message based on receiving the Authentication Request message with the pairwise master key identifier, without re-authenticating client device 210 using EAP authentication. The Association Request message and the Association Response message may be associated with 802.11 association.

As shown by reference number 550, client device 210 and WLAN access point 220 may perform an 802.11 four-way handshake after client device 210 receives the Association Response message. In this way, client device 210 and WLAN access point 220 may re-establish a secure, authenticated WLAN connection while conserving network resources and computing resources associated with unnecessary EAP re-authentication.

While a particular series of operations and/or data flows have been described above with regard to FIG. 5, the order of the operations and/or data flows may be modified in some implementations. Further, non-dependent operations may be performed in parallel.

Implementations described herein permit a client device to prevent re-authentication when a WLAN connection is dropped and re-established, thereby conserving computing resources of an authentication device responsible for EAP authentication, conserving network resources by preventing unnecessary EAP messages from being transmitted, or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    a memory storing instructions; and
    one or more processors to execute the instructions to:
        determine that a first wireless local area network (WLAN) connection, established with a first WLAN access point using an extensible authentication protocol, has been dropped;
        store, at the device, a pairwise master key identifier based on determining that the first WLAN connection has been dropped,
            the pairwise master key identifier being associated with the first WLAN access point and a WLAN controller,
            the pairwise master key identifier identifying a pairwise master key stored at the WLAN controller, and
            the device being different from the first WLAN access point and the WLAN controller;
        detect a WLAN signal, associated with a second WLAN access point, after determining that the first WLAN connection has been dropped,
            the first WLAN access point and the second WLAN access point being controlled by the WLAN controller, and
            the first WLAN access point being different from the second WLAN access point;
        provide the pairwise master key identifier to the second WLAN access point based on detecting the WLAN signal;
        establish a second WLAN connection with the second WLAN access point based on providing the pairwise master key identifier and without re-authenticating using the extensible authentication protocol;
        determine that a threshold amount of time has elapsed since storing the pairwise master key identifier; and
        delete the pairwise master key identifier from the device based on determining that the threshold amount of time has elapsed.

2. The device of claim 1, where the WLAN signal is a first WLAN signal; and
    where the one or more processors are further to:
        detect a second WLAN signal associated with the first WLAN access point;
        provide, based on detecting the second WLAN signal, the pairwise master key identifier to the first WLAN access point; and establish, based on providing the pairwise master key identifier to the first WLAN access point, a third WLAN connection with the first WLAN access point.

3. The device of claim 1, where the one or more processors are further to:
prevent storage, by the device, of an additional pairwise master key identifier while the pairwise master key identifier is stored by the device.

4. The device of claim 1, where the one or more processors, when providing the pairwise master key identifier, are to:
provide the pairwise master key identifier in an 802.11 Association Request message.

5. A non-transitory computer-readable medium storing instructions, the instructions comprising:
one or more instructions that, when executed by one or more processors of a device, cause the one or more processors to:
determine that a first wireless local area network (WLAN) connection, established with a first WLAN access point using an 802.11X extensible authentication protocol, has been dropped;
store, at the device, a pairwise master key identifier, based on determining that the first WLAN connection has been dropped,
the pairwise master key identifier being associated with the first WLAN access point and a WLAN controller,
the pairwise master key identifier identifying a pairwise master key stored at the WLAN controller, and
the device being different from the first WLAN access point and the WLAN controller;
receive a message, associated with a second WLAN access point, after determining that the first WLAN connection has been dropped,
the first WLAN access point and the second WLAN access point being controlled by the WLAN controller, and
the first WLAN access point being different from the second WLAN access point;
provide the pairwise master key identifier to the second WLAN access point based on receiving the message;
establish a second WLAN connection with the second WLAN access point based on providing the pairwise master key identifier and without performing re-authentication using the 802.11X extensible authentication protocol;
determine that a threshold amount of time has elapsed since storing the pairwise master key identifier; and
delete the pairwise master key identifier from the device based on determining that the threshold amount of time has elapsed.

6. The non-transitory computer-readable medium of claim 5, where providing the pairwise master key identifier prevents the re-authentication using the 802.11X extensible authentication protocol.

7. The non-transitory computer-readable medium of claim 5, where determining that the first WLAN connection has been dropped does not include detecting a handover from the first WLAN access point to the second WLAN access point.

8. The non-transitory computer-readable medium of claim 5, where the first WLAN connection and the second WLAN connection are established according to an 802.11r protocol.

9. The non-transitory computer-readable medium of claim 5, where the pairwise master key identifier includes a pairwise master key.

10. The non-transitory computer-readable medium of claim 5, where the one or more instructions, that cause the one or more processors to provide the pairwise master key identifier, cause the one or more processors to:
provide the pairwise master key identifier in association with an Association Request message.

11. A method, comprising:
determining, by a device, that a first wireless local area network (WLAN) connection, established between the device and a first WLAN access point using an extensible authentication protocol, has been dropped;
caching, by the device, a pairwise master key identifier associated with the first WLAN access point and a WLAN controller,
the pairwise master key identifier identifying a pairwise master key stored at the WLAN controller, and
the device being different from the first WLAN access point and the WLAN controller;
detecting, by the device, a WLAN signal, associated with a second WLAN access point, after determining that the first WLAN connection has been dropped,
the first WLAN access point and the second WLAN access point being controlled by the WLAN controller, and
the first WLAN access point being different from the second WLAN access point;
providing, by the device, the pairwise master key identifier to the second WLAN access point based on detecting the WLAN signal;
causing, by the device, a second WLAN connection to be established between the device and the second WLAN access point based on providing the pairwise master key identifier and without causing the device to be re-authenticated using the extensible authentication protocol;
determining, by the device, that a threshold amount of time has elapsed since caching the pairwise master key identifier; and
deleting, by the device, the pairwise master key identifier from the device based on determining that the threshold amount of time has elapsed.

12. The method of claim 11, where the threshold amount of time is greater than or equal to a Dynamic Host Configuration Protocol (DHCP) lease timer.

13. The method of claim 11, where providing the pairwise master key identifier comprises:
providing the pairwise master key identifier in an Association Request message associated with an 802.11 protocol.

14. The method of claim 11, where providing the pairwise master key identifier prevents the device from being re-authenticated using the extensible authentication protocol.

15. The device of claim 1, where the one or more processors are further to:
determine that the threshold amount of time has not elapsed for storing the pairwise master key identifier; and
where the one or more processors, when providing the pairwise master key identifier, are to:

provide the pairwise master key identifier based on determining that the threshold amount of time has not elapsed.

16. The device of claim 1, where a copy of the pairwise master key identifier is stored in the first WLAN access point.

17. The non-transitory computer-readable medium of claim 5, where the one or more instructions, when executed by the one or more processors, further cause the one or more processors to:
 generate the pairwise master key identifier based on the first WLAN connection being authenticated; and
 where the one or more instructions, that cause the one or more processors to store, at the device, the pairwise master key identifier, further cause the one or more processors to:
  store, at the device, the pairwise master key identifier based on generating the pairwise master key identifier.

18. The method of claim 11, further comprising:
 discard the pairwise master key identifier based on determining that an IP address associated with the device for the first WLAN connection expired.

19. The device of claim 1, where the one or more processors, when determining that the first WLAN connection has been dropped, are to:
 determine that a WLAN signal, associated with the first WLAN connection, is not being detected.

20. The method of claim 11, further comprising:
 determining that a WLAN signal, that satisfies a threshold and is associated with the first WLAN connection, is not detected; and
 where determining that the first WLAN connection has been dropped comprises:
  determining, based on the WLAN signal satisfying the threshold, being associated with the first WLAN connection, and not being detected, that the first WLAN connection has been dropped.

* * * * *